United States Patent
Aujay et al.

(10) Patent No.: US 9,733,729 B2
(45) Date of Patent: Aug. 15, 2017

(54) METHOD AND DEVICE FOR SENSING ORIENTATION OF AN OBJECT IN SPACE IN A FIXED FRAME OF REFERENCE

(71) Applicant: MOVEA, Grenoble (FR)

(72) Inventors: Grégoire Aujay, Grenoble (FR); Guillaume Aujay, Grenoble (FR)

(73) Assignee: Movea, Grenoble (FR)

( * ) Notice: Subject to any disclaimer, the term of this patent is extended or adjusted under 35 U.S.C. 154(b) by 513 days.

(21) Appl. No.: 13/727,125

(22) Filed: Dec. 26, 2012

(65) Prior Publication Data
US 2014/0176437 A1    Jun. 26, 2014

(51) Int. Cl.
*G06F 3/03*      (2006.01)
*G06F 3/033*     (2013.01)
*G06F 3/0346*    (2013.01)
*H04M 1/725*     (2006.01)

(52) U.S. Cl.
CPC ...... *G06F 3/0346* (2013.01); *H04M 1/72544* (2013.01); *H04M 2250/12* (2013.01)

(58) Field of Classification Search
CPC .......... G06F 3/0346; G06F 3/033; G06F 3/03; G06F 3/017; G06F 1/1694
See application file for complete search history.

(56) References Cited

U.S. PATENT DOCUMENTS

| 2009/0326857 A1* | 12/2009 | Mathews | G06F 3/0346 702/141 |
| 2010/0150404 A1* | 6/2010 | Marks | G06T 7/0018 382/107 |

\* cited by examiner

*Primary Examiner* — Lisa Landis
(74) *Attorney, Agent, or Firm* — Stroock & Stroock & Lavan LLP

(57) ABSTRACT

The invention discloses an improved method and device for sensing orientation of an object in space in a Working Reference Frame. The device of the invention includes an angular velocity sensor with at least two sensing axes and a linear acceleration sensor with at least three sensing axes. The method used for sensing orientation of the object in space in the Working Reference Frame uses synthetic values of the gravity component of the acceleration of the object. It depends upon the number of sensing axes of the angular velocity sensor and upon the dynamicity of the movement of the object. The dynamicity of the movement of the object is tested to compute the synthetic values which are used. The method and device of the invention allow control of a cursor on a display, independently of the roll imparted to the device by a user, in a seamless manner which is greatly improved over the devices and methods of the prior art.

19 Claims, 7 Drawing Sheets

METHOD AND DEVICE FOR SENSING ORIENTATION OF AN OBJECT IN SPACE IN A FIXED FRAME OF REFERENCE

FIELD OF THE INVENTION

The present invention deals with a man machine interface capable of sending commands to electronic devices. More specifically, it improves the capability of air pointers to control the movements of a cursor on a display.

The display can be a computer display, a TV screen connected to a set-top box, a game console, etc. The air pointer can be a 3D mouse, a smart phone or tablet equipped with motion sensors or even a finger or a limb of a user equipped with a sensor/processing assembly.

BACKGROUND

Air pointers may be used as a remote control in many different situations and may have diverse functions. For example, a remote control of an audiovisual apparatus (television, reader/recorder of disks, hi-fi system) can be used to select a program or choose a function from a menu. A remote control of a household apparatus may be used to point at the apparatus to command the execution of a specific function. When an air pointer is used as a computer remote control, the pointer can be programmed as a function of the applications executed by the computer. In an electronic game interface, depending on the game, the pointer may emulate an object manipulated by the user (golf club, tennis racket, bowling ball, handgun, etc.). An air pointer may also provide an assistance for the man-machine interface or serve as a remote control intended for persons with reduced mobility: for example, an air pointer can be fixed to the head, the spectacles, an earpiece, or any other part tied to the movements of the head, so as to aid persons with motion deficiency or who are unable to use a conventional hand-held mouse. In general, the air pointer is equipped with buttons which allow selection of a command, or which can be programmed to execute a function (or a service). The buttons can also be used to associate different pointer states during pointing gestures by recognizing the gestures from some characterizing features and/or a matching with a database of specific gestures.

The movements of the pointer in space comprise rotations and translations. They can be measured by sensors of various types. For example, cameras or image sensors can measure rotations and translations simultaneously by comparison of successive images and using geometric transformations. Alternatively, a combination of magnetometers, accelerometers and/or of gyrometers can measure translations and rotations about several axes of the air pointer. A system comprising a combination of one or more cameras and several magnetometric, accelerometric and/or gyrometric sensors can be used to improve measurement accuracy and redundancy.

The general problem that these applications of motion sensing pointers must solve is to take account of the manner in which the user holds the pointer, in particular the orientation of the pointer in space. If the pointer has rotated in the hand of the user along its longitudinal axis and is held for example at 45°, a horizontal or vertical motion of the pointer will result in a diagonal motion on the screen to which the pointer is pointing. This phenomenon is known by the name "tilt" or torsion. It should therefore be corrected in order for the pointer to be more user friendly.

A first option for solving this problem is to provide mechanical means so that the sensors remain in a substantially fixed position in the frame of reference of the screen when the user imparts a torsion motion to the pointer. It is thus possible to provide for the sensor or sensors to be mobile within the pointer in the manner of a pendulum whose base has sufficient inertia to remain substantially fixed in spite of the torsion movements imparted to the pointer. Such a device is disclosed by U.S. Pat. No. 5,453,758. It is also possible to encapsulate said sensors in a stabilization device consisting of a pair of spheres tied to the pointer by rotation axes, as is the case in a compass aboard a boat or an aircraft. Such a device is disclosed by U.S. Pat. No. 5,440,326. A first drawback of these mechanical devices for compensating for the torsion of the pointer is that they are limited to restricted spans of angles of torsion and rates of displacement. A second drawback is that these devices are bulky. A third drawback resides in the mechanical inertia of these devices and the delay in the horizontal alignment induced, thus barring them from real-time pointing applications.

A second option for compensating for the torsion of the pointer consists in computing the angles of torsion by using the measurements of some of the sensors embedded aboard the pointer, notably accelerometers. The computed angles of torsions are then used to perform a transformation of the measurements of the sensors from the reference frame of the pointer into the reference frame of the screen by applying to said measurements one or more rotation matrices whose coefficients are dependent on the calculated torsion angles. Such procedures are disclosed notably by i) patent U.S. Pat. No. 5,902,968 where the main sensor is a gyrometer and the sensor for computing the angle of torsion is an accelerometer, ii) patent application US 2004/0075650 where the main sensor is a camera coupled to accelerometers, the combination allowing tilt correction, iii) patent application US 200210140745 where the main sensor is a GPS receiver and the tilt correction sensor a set of accelerometers and iv) patent U.S. Pat. No. 7,158,118 where the main sensor consists of one or more gyrometers and the tilt correction sensor consists of one or more accelerometers. These procedures have the drawback of providing noisy and inaccurate results insofar as the torsion angles are computed by using trigonometric calculations which are not adapted to fixed point/small memory processors which are preferably used in low cost air pointing devices.

A new way of correcting the tilt has been disclosed by U.S. Pat. No. 8,010,313 assigned to the assignee of the present application. According to this invention, instead of computing the tilt angle with the canonic trigonometric formulas, the measurements of the accelerometers are directly used to correct the measurements of the gyro sensors.

It has also been found that it may be advantageous to use only one accelerometer measurement at a moment in time to accomplish the tilt correction, so as to simplify the calculation of the correction and use less computing power, which is then freed for other tasks. Also, when an accelerometer axis is close to the vertical, the variation of the accelerometer signal due to a change in the roll angle is small compared to the noise level. Therefore, the values close to 1 lack precision and the roll correction along this axis is not accurate for angles higher than around 70°, leading to an overall bias affecting the cursor movements on the display. PCT application filed as PCT/EP2011/056925 assigned to the applicant of the current application proposes a solution to this class of problems.

None of these prior art references, though, discloses solutions which are well suited to use cases where the user imparts significant dynamics to the pointer. In these use cases, the measurements of the accelerometers comprise a proper acceleration component which cannot be neglected. Therefore, since what is needed is the gravity component of the accelerometers measurements, the proper acceleration components create deviations of the cursor to be controlled from the trajectory it should follow to properly convert the movements intended by the user. Low pass filtering the outputs of the accelerometer, as proposed by U.S. Pat. No. 7,158,118 does not provide a solution to this problem since low pass filtering only averages the proper acceleration components, but does not eliminate them. Moreover, using a low pass filter makes the system less responsive.

SUMMARY OF THE INVENTION

The present invention solves this problem by providing a method for correcting the tilt using synthetic values of the gravity component of the acceleration of the object which are calculated depending on the type of sensors which are available in the device and on the dynamics of the movements imparted to the air pointing device by the user.

To this effect, the invention provides A system for sensing orientation of a moving object in a Working Reference Frame, said system comprising:
- a first sensor for sensing one of angular velocity and angular position of the object with at least two active sensing axes;
- a second sensor for sensing acceleration of the object with three sensing axes;
- a processing module configured to convert object orientation data from a Sensing Reference Frame to the Working Reference Frame by fusing a motion vector Vm composed from some or all of the outputs from the first sensor and a synthetic vector Vsyn representative of the gravity components of the acceleration of the object, said synthetic vector Vsyn being calculated as a weighted average of a corrected vector Vcor with weight K composed from the outputs of at least one of the first and the second sensors, and an acceleration vector Vac with weight (1−K) composed from some of the outputs of the second sensor;

wherein the calculation of the corrected vector Vcor depends on the number of active sensing axes of the first sensor and K is a function of a dynamicity variable D of the movement of the object.

Advantageously, the dynamicity variable D is derived from the results $D_i$ (i≥1) of one or more weighted dynamicity tests based on outputs from at least one of the first and the second sensors.

Advantageously, the dynamicity tests yield binary results ($D_i=\{0;1\}$), and the dynamicity variable D of the system is a logical combination of the results $D_i$ of the dynamicity tests.

Advantageously, the weighting factor (1−K) is equal to 1 when the dynamicity tests determine that it is in a quasi-static state and equal to null in all other instances.

Advantageously, at least one of the weighted dynamicity tests is based on a norm N of the outputs of one of the first and second sensor.

Advantageously, the result ID of said dynamicity test is null when the norm N falls within a predefined range, and equal to one in all other instances.

Advantageously, at least one of the weighted dynamicity tests is based on a variance V of the outputs of one of the first and second sensor.

Advantageously, the variance V is compared to a preset threshold, and the result $D_i$ of said dynamicity test is null when said variance is larger than the threshold, and equal to one in all other instances.

Advantageously, at least one of the weighted dynamicity tests is an orientation test, where the outputs of at least the second sensor are compared to the gravity vector.

Advantageously, the orientation test is based on the angle between the roll axis of the sensing device and the gravity vector, and the result of the orientation test $D_i$ is null when the angle is larger than a preset threshold, and equal to one in all other instances.

Advantageously, the first sensor comprises two active sensing axes and the corrected vector Vcor at time t equals the acceleration vector Vac at time ts when the object was last in a state where D=0 and wherein the weighting factor (1−K) is on average a decreasing function of the dynamicity D of the movement of the object.

Advantageously, the first sensor comprises three active sensing axes and the corrected vector Vcor at time t is computed based on at least one of the outputs of the first sensor at time t.

Advantageously, weight K is equal to 1 when the dynamicity variable D is equal to 1 and to 0 when D is equal to 0.

Advantageously, the first sensor is a gyrometer and the second sensor is an accelerometer.

The invention also provides A handheld device for controlling a cursor on a display, comprising:
- a first sensor for sensing one of angular velocity and position of the handheld device with at least two active sensing axes;
- a second sensor for sensing acceleration of the handheld device with three sensing axes;
- said first and second sensors being in communication with a processing module configured to convert the handheld device orientation data from a Sensing Reference Frame to a Working Reference Frame by fusing a motion vector Vm composed from some or all of the outputs from the first sensor and a synthetic vector Vsyn representative of the gravity components of the acceleration of the object, said synthetic vector Vsyn being calculated as a weighted average of a corrected vector Vcor with weight K composed from the outputs of at least one of the first and the second sensors, and an acceleration vector Vac with weight (1−K) composed from some of the outputs of the second sensor;

wherein the calculation of the corrected vector Vcor depends on the number of active sensing axes of the first sensor and K is a function of a dynamicity variable D of the movement of the object, and the results of the fusion control a movement of the cursor on the display independently of the roll movement of the handheld device.

Advantageously, the first sensor comprises two active sensing axes and the corrected vector Vcor at time t equals the acceleration vector Vac at time ts when the object was last in a state where D=0 and wherein the weighting factor (1−K) is on average a decreasing function of the dynamicity D of the movement of the object.

Advantageously, the first sensor comprises three active sensing axes and the corrected vector Vcor at time t is computed based on at least one of the outputs of the first sensor at time t.

The invention also provides a method for controlling a cursor on a display with a handheld device, comprising the steps of:

acquiring signals from a first sensor for sensing one of angular velocity and angular position of the handheld device with at least two active sensing axes;

acquiring signals from a second sensor for sensing acceleration of the handheld device with three sensing axes;

processing the signals from said first and second sensors with a processing module configured to convert handheld device orientation data from a Sensing Reference Frame to a Working Reference Frame by fusing a motion vector Vm composed from some or all of the outputs from the first sensor and a synthetic vector Vsyn representative of the gravity components of the acceleration of the object, said synthetic vector Vsyn being calculated as a weighted average of a corrected vector Vcor with weight K composed from the outputs of at least one of the first and the second sensors, and an acceleration vector Vac with weight (1−K) composed from some of the outputs of the second sensor;

wherein the calculation of the corrected vector Vcor depends on the number of active sensing axes of the first sensor and K is a function of a dynamicity variable D of the movement of the object, and the result of the fusion controls a movement of the cursor of the display independently of the roll movement of the handheld device.

Additionally, the invention procures a computer program configured for controlling a cursor on a display with a handheld device when executed on computer, said computer program comprising modules fit for acquiring signals from a first sensor for sensing angular velocity of the object with at least two active sensing;

acquiring a second sensor for sensing linear acceleration of the object with three sensing;

processing the signals from said first and second sensors with a processing module configured to convert handheld device orientation data from a Sensing Reference Frame to a Working Reference Frame by fusing a motion vector Vm composed from some or all of the outputs from the first sensor and a synthetic vector Vsyn representative of the gravity components of the acceleration of the object, said synthetic vector Vsyn being calculated as a weighted average of a corrected vector Vcor with weight K composed from the outputs of at least one of the first and the second sensors, and an acceleration vector Vac with weight (1−K) composed from some of the outputs of the second sensor;

wherein the calculation of the corrected vector Vcor depends on the number of active sensing axes of the first sensor and K is a function of a dynamicity variable D of the movement of the object, and the result of the fusion controls a movement of the cursor on the display independently of the roll movement of the handheld device.

The invention offers the other advantage of being possibly used with different configurations of sensors. It also offers a selection of a number of different algorithms to implement its different functions. An OEM vendor may then elect different combinations of hardware/software features to best suit its use cases and/or technical requirements, such as the type of microcontroller needed to implement the solution.

The invention will be better understood and its various features and advantages will become apparent from the description of various embodiments and of the following appended figures.

Unless another specific meaning is given in a definite context, the abbreviations and acronyms have the meanings indicated in the table below.

| Acronym | Meaning |
| --- | --- |
| ADC | Analogue to Digital Converter |
| CC | Correction Curve |
| COC | Controlling Orientation Coordinates |
| CRF | Controlling Reference Frame |
| DOF | Degree Of Freedom |
| FP | Focus Point |
| SD | Sensing Device |
| SRF | Sensing Reference Frame |
| UH | User's Hand |
| WF | World Frame |
| WRF | Working Reference Frame |

DETAILED DESCRIPTION OF THE INVENTION

Figure 1:
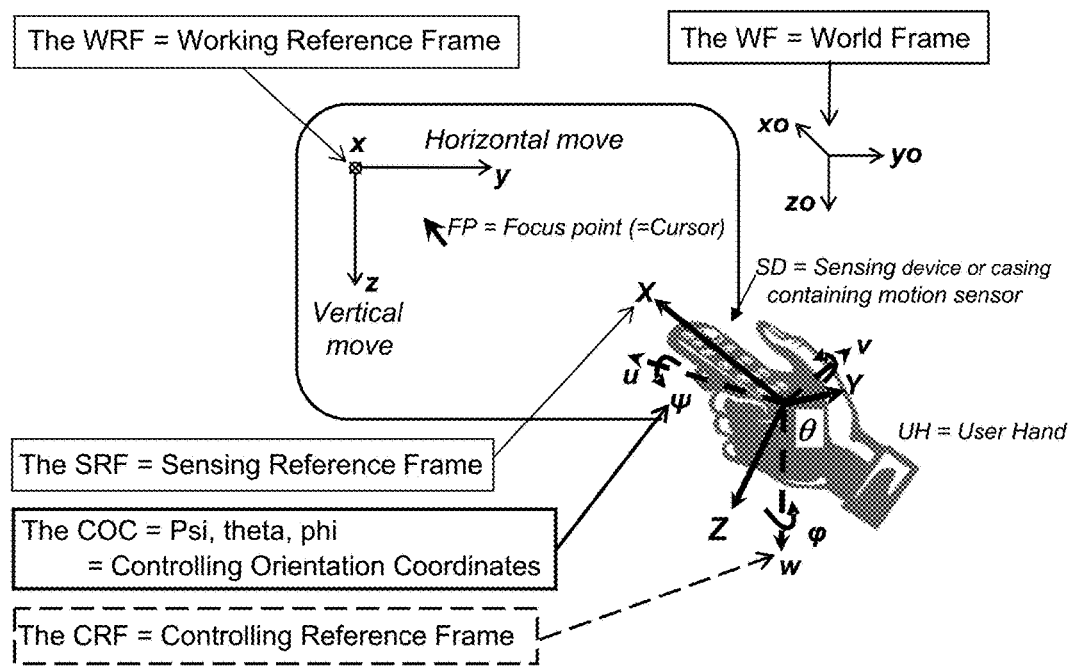
FIG. 1 represents a device controlling a display according to an embodiment of the invention and the different frames in which attitude and position coordinates can be referenced.

FIG. 1 represents a device controlling a display according to an embodiment of the invention. The figure also shows the different frames in which attitude and position coordinates can be referenced.

The remote control is used to correctly map the movements of a User's Hand (UH) which bears or holds motion sensors or Sensing Devices (SD) to the movements of a "Focus Point" (FP), for example a cursor, inside a Working Reference Frame (WRF). The different elements and frames of reference of the system are illustrated on FIG. 1.

An interesting property of the general system is that the user's brain is in-the-loop so that the displacement of FP is controlled by the intention of the user who uses the two angular movements (yaw and pitch in the WF) of his hand to move the cursor. When the FP moves in a plane, its movement in the WRF has two Degrees Of Freedom (DOF). In essence, the UH should move with the same number of DOF, so that the user is controlling the FP with as less effort as possible. The problem to be solved is therefore to map these 2 DOF of the UH (positioned by the mobile Controlling Reference Frame relatively to the World Frame (WF)) to 2 two DOF of the motionless WRF.

Sensors in the SD will be preferably chosen among oriented axial sensors which are mounted to be in a fixed position in the SRF. Preferably, the mapping which is done is:

From SD: sensing the angular velocity (for instance by means of a 2 axis gyro meter, gyro_y, gyro_z);

To FP: dy, dz small displacements in the WRF.

As is known by the man skilled in the art of motion capture, this mapping is done by the following transfer function:

$$dy = Cy*\text{gyro}\_z \quad \text{(Équation 1)}$$

$$dz = Cz*\text{gyro}\_y \quad \text{(Équation 2)}$$

Where:
- dy is the elementary translation of the cursor along y axis oriented positively to the right on FIG. 1;
- dz is the elementary translation of the cursor along z axis oriented positively to the bottom on FIG. 1;
- Cy and Cz are constant values to adapt the sensitivity of the system (for instance to the screen resolution or to the velocity which is desired for the FP displacement, taking into account the sensitivity of the gyro sensor);
- gyro_z is the value given by the gyrometer in response to a rotation around the Z axis, positively oriented from X to Y;
- gyro_y is the value given by the gyrometer in response to a rotation around the Y axis, positively oriented from X to Z.

Usually, the SRF is fixed in relation to the CRF, but the situation could be different as the SD is most of the time not mechanically fixed to the UH, or the wrist could have rolled (i.e. rotated around the forearm axis). In this case, a horizontal or vertical movement of the remote by the user will lead to an unintended diagonal course of the cursor.

Figure 2:
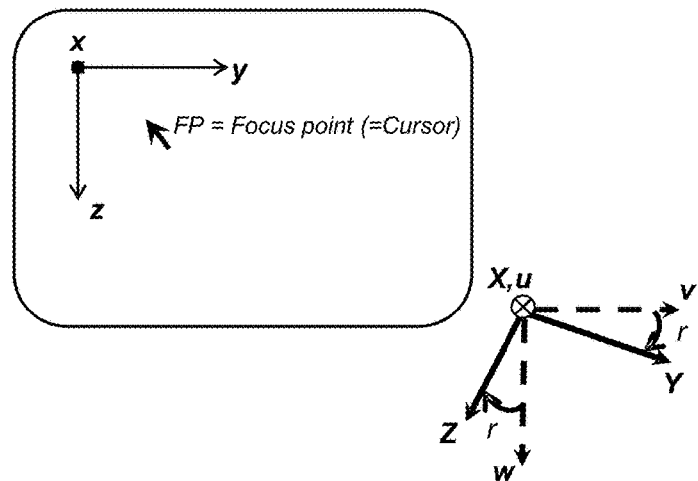
FIG. 2 represents the roll/tilt angle defined between the Controlling Reference Frame and the Sensing Reference Frame, in an embodiment of the invention.

FIG. 2 represents the roll/tilt angle defined between the Controlling Reference Frame and the Sensing Reference Frame, in an embodiment of the invention.

More specifically, we take an example where the SD has rolled inside the UH, i.e. sensing axes Y,Z and actuating axes v,w are not aligned anymore, but separated by an angular deviation: roll=r angle as shown in FIG. 2. This roll introduces a mismatch between the axes of rotation of the UH and the measurements of the sensors which are not aligned anymore with said axes.

As disclosed among other prior art references by U.S. Pat. No. 7,158,118, this problem can be solved by a change of reference frame of an angle r by first measuring the tilt angle and then calculating a rotation matrix, the coefficients of which are the sine and cosine of r.

This matrix is then applied to the gyro meter sensor values to compensate the roll. For a corrected motion mapping, with a known roll angle r, the following classical equations are applied:

$$dy = Cy*(\cos(r)*\text{gyro}\_z - \sin(r)*\text{gyro}\_y) \quad \text{(Équation 3)}$$

$$dz = Cz*(\sin(r)*\text{gyro}\_z + \cos(r)*\text{gyro}\_y) \quad \text{(Équation 4)}$$

Or:

$$dy = Cy(\kappa*\text{gyro}\_z - \sigma*\text{gyro}\_y) \quad \text{(Équation 5)}$$

$$dz = Cz*(\sigma*\text{gyro}\_z + \kappa*\text{gyro}\_y) \quad \text{(Équation 6)}$$

Figure 3:
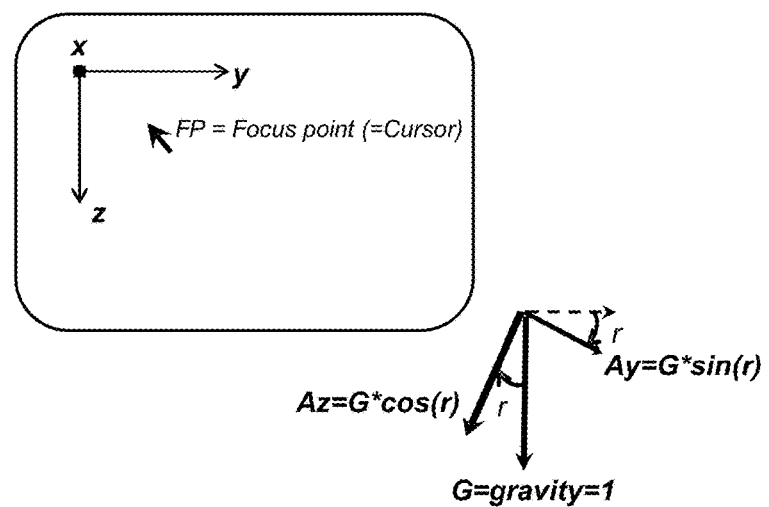
FIG. 3 illustrates the operation mode of a roll correction algorithm embodied in a device of the prior art.

FIG. 3 illustrates the operation mode of a roll correction algorithm embodied in a device of the prior art.

It is possible to directly calculate the roll angle like in U.S. Pat. No. 7,158,118 (Liberty):

$$r = a\tan(Ay/Az) \quad \text{(Équation 7)}$$

It is also possible to avoid the computation of roll angle r, according to the invention disclosed by U.S. Pat. No. 8,010,313 (Matthews), thus saving on the computing power which is needed. According to this invention, the readings of the two axes accelerometer are directly input as correction factors of the gyrometers readings, after or before a normalization by the norm of the acceleration vector.

The correction equations are then of the following algebraic linear form:

$$dy = Cy*(Az/Ayz*\text{gyro}\_z - Ay/Ayz*\text{gyro}\_y) \quad \text{(Équation 8)}$$

$$dz = Cz*(Ay/Ayz*\text{gyro}\_z + Az/Ayz*\text{gyro}\_y) \quad \text{(Équation 9)}$$

Where Ayz denotes the norm of Ay+Az vector in the (Ay,Az) plane. When SD has some roll but is horizontal on the X axis in the UH, this norm is equal to 1, thus leading to the following simplified equations:

$$dy = Cy*(Az*\text{gyro}\_z - Ay*\text{gyro}\_y) \quad \text{(Équation 10)}$$

$$dz = Cz*(Ay*\text{gyro}\_z + Az*\text{gyro}\_y) \quad \text{(Équation 11)}$$

In a vector representation, the cursor displacement vector Vcd can be calculated based on a fusion between two vectors: motion vector Vm and acceleration vector Vac.

$$Vcd = \text{fusion}(Vm, Vac) \quad \text{(Equation 12)}$$

The components of the motion vector Vm are based on the outputs of the gyrometer, and the components of the acceleration vector Vac are based on the outputs of the accelerometer.

We note that:
- in a neutral position, r=0, Az=1 and Ay=0, thus getting back to (Équation 1) and (Équation 2);
- when SD is upside down, r=180°, Az=−1, Ay=0, the gyro values are opposed in sign to the cursor displacement, because of the symmetrical transformation in relation to the central point;
- when SD has rolled of a +90° value in the UH, Az=0, Ay=1, the two gyro axes are swapped to deal with each display axis. gyro_y is opposed in sign because our convention on this measurement was not the same direct convention as for gyro_z.

Also, we note that the roll angle r is only equal to the angle measured at the output of the accelerometers when the device is quasi-static, i.e. when there is no proper acceleration, the output of the accelerometers represent the components of the acceleration due to gravity, with the equations displayed on FIG. 3:

$$Ay = G*\sin(r) \quad \text{(Equation 13)}$$

$$Az = G*\cos(r) \quad \text{(Equation 14)}$$

When the user imparts significant dynamics to the pointing device, this is no longer true because the accelerometers measure the proper acceleration of the device in addition to the acceleration due to gravity. This means the roll angle r cannot be calculated by using the accelerometers only, and the roll compensation algorithms based on Equations 7 through 11 and 13, 14 are no longer accurate. The more dynamics there is, the more inaccurate is the roll compensation.

The inventive device and method disclosed therein allow to overcome the limitations of these devices and methods of the prior art.

Figure 4A:
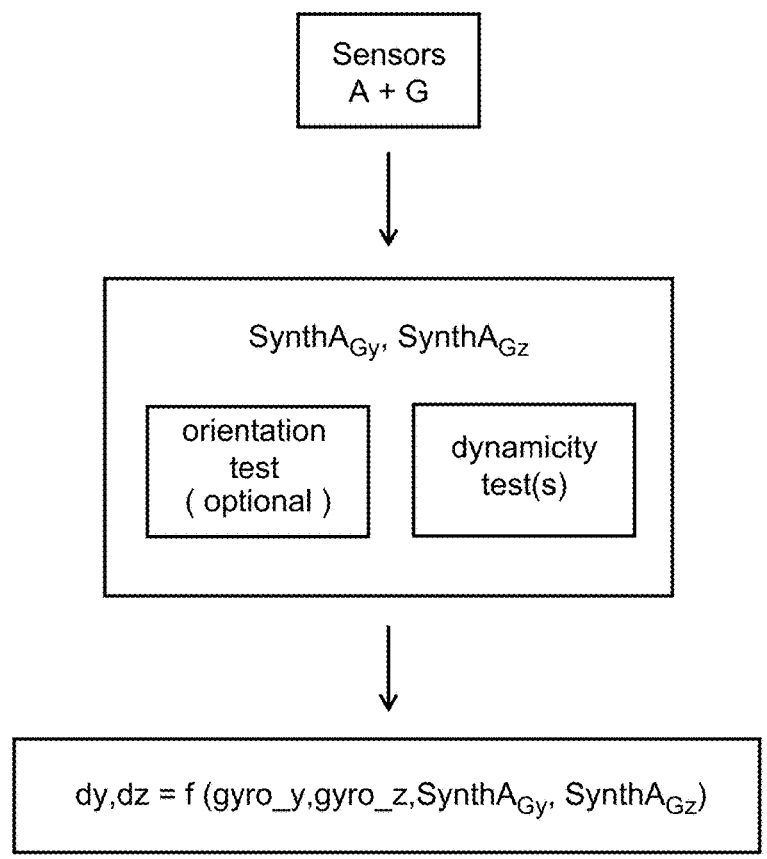
FIG. 4a is a functional diagram which explains the way the invention works.

FIG. 4*a* is a functional diagram which explains the way the invention works.

When the outputs of the accelerometer, $A_y$ and $A_z$ include a significant proper acceleration, they should be substituted by other values, that we designate herein as "synthetic values", which are more representative of the gravity components of the acceleration that are needed for the roll compensation. We must therefore:
- test if we can use $A_y$ and $A_z$ as is or if we need to use substitute synthetic values (orientation and dynamicity tests);
- depending on the tests results, compute the synthetic values;
- combine $A_y$ and $A_z$ or their synthetic substitutes with the gyro readings to perform roll compensation.

The variables $SyntA_{Gy}$ and $SyntA_{Gz}$ represent the gravity components of the acceleration, uninfluenced by the proper acceleration of the device. This means that the acceleration vector Vac has to be replaced by a synthetic vector Vsyn which is composed from the synthetic gravity components of the acceleration (for example Vsyn=($SyntA_{Gy}$, $SyntA_{Gz}$)). The cursor displacement vector Vcd is thus based on the fusion between the motion vector Vm and synthetic vector Vsyn:

$$Vcd=\text{fusion}(Vm, Vsyn) \qquad \text{(Equation 15)}$$

The implementation of the synthetic gravity components of the acceleration is explained in more details here below.

Figure 4B:
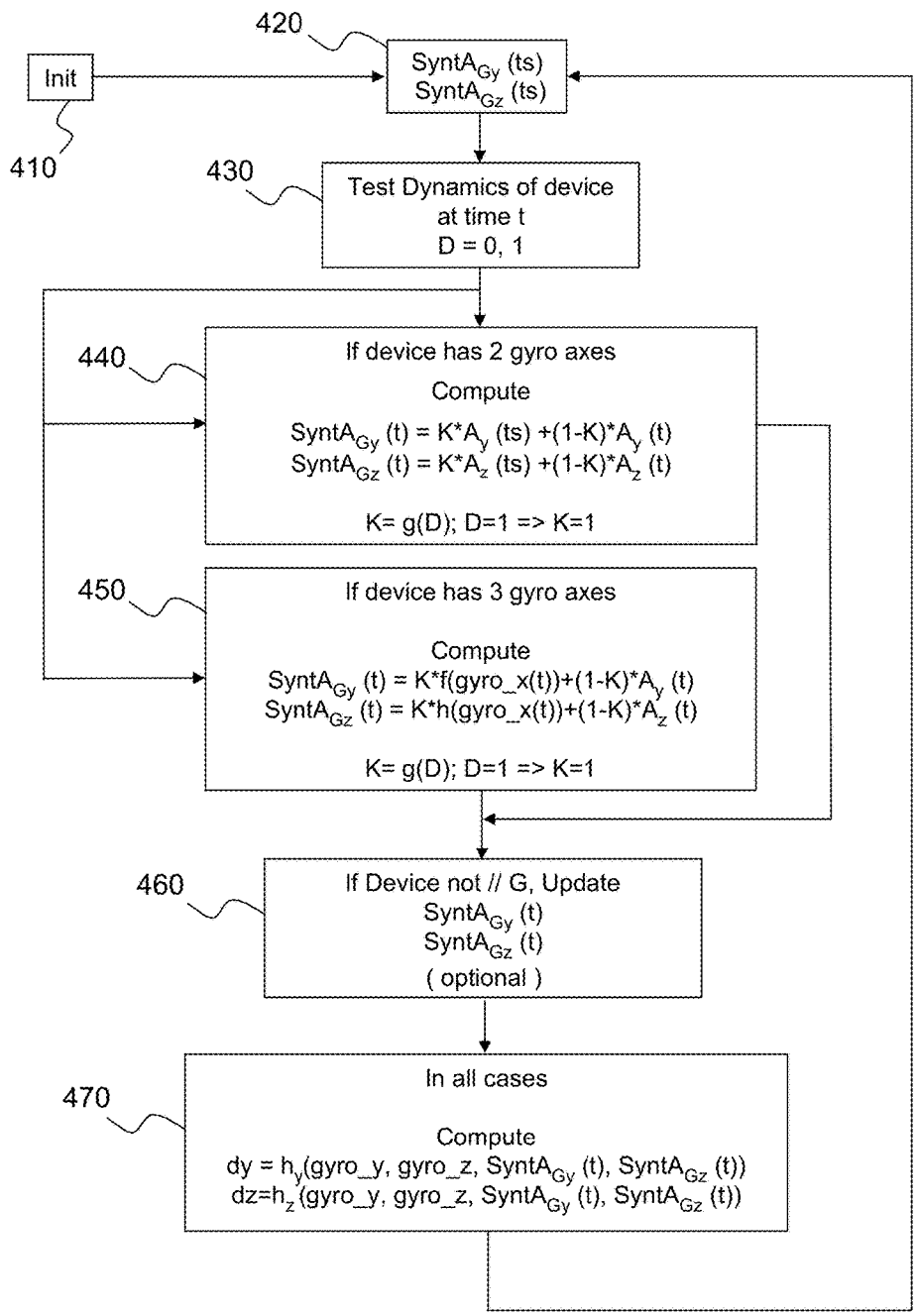
FIG. 4b is a flow chart of the method of the invention according to some of its embodiments.

FIG. 4b is a flow chart of the method of the invention according to some of its embodiments.

According to the invention, after an initialization at step 410, we define, at step 420, two variables as synthetic values of the gravity components of the acceleration of the device at time t−1 along axes y and z: $SyntA_{Gy}$ (t−1) and $SyntA_{Gz}$ (t−1).

Depending upon the results of tests of the dynamicity of the movement of the device which are performed at step 430, and which will be explained in commenting FIGS. 5 and 6, different inputs will be used to compute $SyntA_{Gy}$ (t) and $SyntA_{Gz}$ (t). The output of the different tests performed at step 430 is a variable D which is equal to 0 when the device is deemed to be in a (quasi-)static situation and equal to 1 when it is deemed to be in a dynamic situation. The variable may be binary or take more than two values. For instance when a continuous variable is taken as the basis of the test, D may take a number of corresponding values between 0 and 1 to characterize the amount of dynamicity of the device.

Also the computations will depend on the configuration of the sensors available to measure the movements of the device. In all configurations illustrative of the embodiments described in details herein, we use a 3-axis accelerometer, even though, it is perfectly possible to use an accelerometer with two sensing axes only. One may use either a 2-axis gyrometer or a 3-axis gyrometer. In the exemplary embodiments of the first type (denoted "3A2G"), the gyrometer measures the angular acceleration around axes y and z (pitch and yaw). In the exemplary embodiments of the second type (denoted "3A3G"), the gyrometer measures, in addition, the angular velocity around axis x, which is the roll axis along which angle r is defined.

The computations performed in the case of a 3A2G configuration are displayed in box 440:

$$SyntA_{Gy}(t)=K^*A_y(ts)+(1-K)^*A_y(t) \qquad \text{(Equation 16)}$$

$$SyntA_{Gz}(t)=K^*A_z(ts)+(1-K)^*A_z(t) \qquad \text{(Equation 17)}$$

where time ts represents the last time when the device was in a quasi-static state.

Or, using the synthetic vector Vsyn:

$$Vsyn(t)=K^*Vac(ts)+(1-K)^*Vac(t) \qquad \text{(Equation 18),}$$

The weights K and (1−K) depend on the dynamicity variable D. In its simplest embodiment, the weight K equals the dynamicity D. In this case, when the device is in a (quasi-)static situation, D=0 (K=0), the synthetic accelerations are equal to the instantaneous output of the accelerometers. As indicated above, in this situation, the proper acceleration may be neglected and the measurements from the accelerometer will be a good estimate of the gravity components. When the device is in a dynamic situation, D=1 (K=1), the synthetic accelerations are taken to be equal to the acceleration values at time ts when the device was last in a quasi-static state. This way, the synthetic accelerations will always represent the last acceleration values before the state of the device changed from static to dynamic. This is because, in a dynamic state, it is no longer possible to neglect the proper acceleration of the device and the outputs of the accelerometer are no longer a good estimate of the gravity components which are the ones which are needed to be input in equations 7 through 14 above. In an alternative embodiment, K can be taken as a continuous variable defined between D=0 (quasi-static state) and D=1 (dynamic state). This means that the synthetic gravity components at time t are a weighted average of the outputs of the accelerometers at time ts (when the device was last in a quasi-static state) and the current outputs of the accelerometers.

The computation performed in the case of a 3A3G configuration are displayed in box 450:

$$SyntA_{Gy}(t)=K^*f(\text{gyro\_}x(t))+(1-K)^*A_y(t) \qquad \text{(Equation 19)}$$

$$SyntA_{Gz}(t)=K^*h(\text{gyro\_}x(t))+(1-K)^*A(t) \qquad \text{(Equation 20)}$$

Or, using the synthetic vector Vsyn:

$$Vsyn(t)=K^*Vgyr(t)+(1-K)^*Vac(t) \qquad \text{(Equation 21)}$$

where the components of the gyrometer vector Vgyro are calculated based on the outputs of the gyrometer, for example the gyrometer on the roll axis (x).

The underlying assumption of these equations is that, when the pointing device is in a dynamic state, the output of the accelerometers cannot be relied upon. It should be replaced by functions f and h of the output gyro_x of the gyrometer around axis x, which is available in this configuration to compute synthetic values of the gravity components of the acceleration of the device. By way of example, an adequate function may for instance consist in performing an integration of the output gyro_x (which will give angle r) and then in taking the sine of this value for $SyntA_{Gy}$ (t) and the cosine of this value for $SyntA_{Gz}$ (t). The performance of the system can be increased by also taking the gyrometers on y- and z-axis into account, in addition to the gyrometer on the x-axis.

K is a coefficient which is a function of the variable at the output of the dynamicity tests. A boundary condition will be that when D=1, K=1. When D=0, it is possible to take K=0 and therefore only rely upon the accelerometers, but it may be preferable to include f(gyro_x(t)) with a minimal weight (for example K=0.1). When D is a variable having more than two discrete states or even a continuous variable, it is possible to have the weight K of the gyrometer measurement around axis x vary monotonously with D.

In this 3A3G configuration, it is also possible to extract the r value which is needed from an attitude matrix of the device, using quaternions or Euler angle representations. For instance, we may use the method disclosed by the PCT application filed under n° PCT/EP2012/060792 assigned to the same applicant which is incorporated herein by reference. The value of the quaternion at t+1, $\bar{q}(t+1)$, is derived from the value of the quaternion at t, $\bar{q}(t)$, by the following formula:

$$\bar{q}(t+1) = \begin{bmatrix} \frac{\omega}{|\omega|} \cdot \sin\left(\frac{|\omega|}{2}\Delta t\right) \\ \cos\left(\frac{|\omega|}{2}\Delta t\right) \end{bmatrix} \otimes \bar{q}(t)$$

Where ω represents the rotation around the axis and |ω| is the angular velocity measured by the gyrometer around the same axis. For the value of the quaternion $\bar{q}(t)$, the output of the accelerometer when the device was last in a (quasi-) static state can be used. Alternatively, $\bar{q}(t)$ can be taken from a previous quaternion rotation using the above formula.

It is also possible to replace Equations 19 and 20 by a fusion algorithm between the output of the gyrometer and the output of the accelerometer where the parameters of the fusion will depend on the dynamicity of the movement of the device. For example, the angle of rotation of the device can be determined by integration of the gyrometer signals, where the errors due to drift and noise can be corrected by weighted accelerometer readings. These weights may depend on the dynamicity of the system; e.g. the higher the dynamicity, the lower the weight of the accelerometer readings because they are affected by the proper acceleration. One such method of fusion may use for example a non linear complimentary filtering of the Special Orthogonal group type (SO3). See for example "*Attitude estimation on SO*(3) *based on direct inertial measurements*", by Hamel, Mahony (Proceedings of the International Conference on Robotics and Automation (ICRA), May 15-19 2006, IEEE), or "*Nonlinear complementary filters on the special orthogonal group*", by Mahony, Hamel (IEEE Transactions on Automatic Control 53, 5 (2008) 1203-1217). Alternatively, a Kalman filter or an Extended Kalman Filter can be used.

Once the values of the synthetic gravity components of the acceleration have been computed by one of the boxes 440 or 450, we can perform an optional orientation test (step 460). We perform a test using Ax to see if the orientation O of the pointing device is not close to vertical, meaning the x-axis is close to parallel with the gravity vector. If the x-axis is close to vertical, the y- and z-axes are dose to horizontal and the accelerometer readings become unreliable. If the outcome of the test is that the pointing device is not close to vertical, the synthetic gravity components calculated in block 440 (case 3A2G) or block 450 (case 3A3G) are update and used in the roll compensation. However, if the co-linearity of Ax and G is assessed, no update is performed. If the optional orientation test is not performed the synthetic gravity components computed in boxes 440 or 450 are used directly in the roll compensation.

Then, at step 470, the then current values of the synthetic gravity components of the acceleration can be input in Equations 10 and 11, where Ay and Az are replaced respectively by $SyntA_{Gy}(t)$ and $SyntA_{Gz}(t)$.

A more general form of these equations can be used, where:

$$dy = h_y(\text{gyro\_y}, \text{gyro\_z}, SyntA_{Gy}(t), SyntA_{Gz}(t)) \quad \text{(Equation 22)}$$

$$dz = h_z(\text{gyro\_y}, \text{gyro\_z}, SyntA_{Gy}(t), SyntA_{Gz}(t)) \quad \text{(Equation 23)}$$

The function h may be another composition of the values of gyro_y and gyro_z and of the synthetic gravity components of the acceleration. For example, the function can consist of applying a rotation matrix to the gyrometer vector (gyro_y, gyro_z), wherein the rotation matrix is based on the synthetic gravity components.

The general form in vector representation gives for the synthetic vector Vsyn:

$$Vsyn(t) = K^*Vcor(t) + (1-K)^*Vac(t),$$

where the corrected vector Vcor is less (or not) influenced by the dynamicity of the device than the acceleration vector Vac.

The synthetic vector Vsyn can thus be used for the correct calculation of the cursor displacement. As seen in equations 18 and 21, the corrected vector Vcor(t) depends on the number of sensing axes of the gyrometer. In the case 3A2G (eq. 18), the corrected vector Vcor(t)=Vac(ts), and in the case 3A2G (eq. 21), the corrected vector Vcor(t)=Vgyro(t) where the components of the gyrometer vector Vgyro are calculated based on the outputs of the gyrometer.

Figure 5:
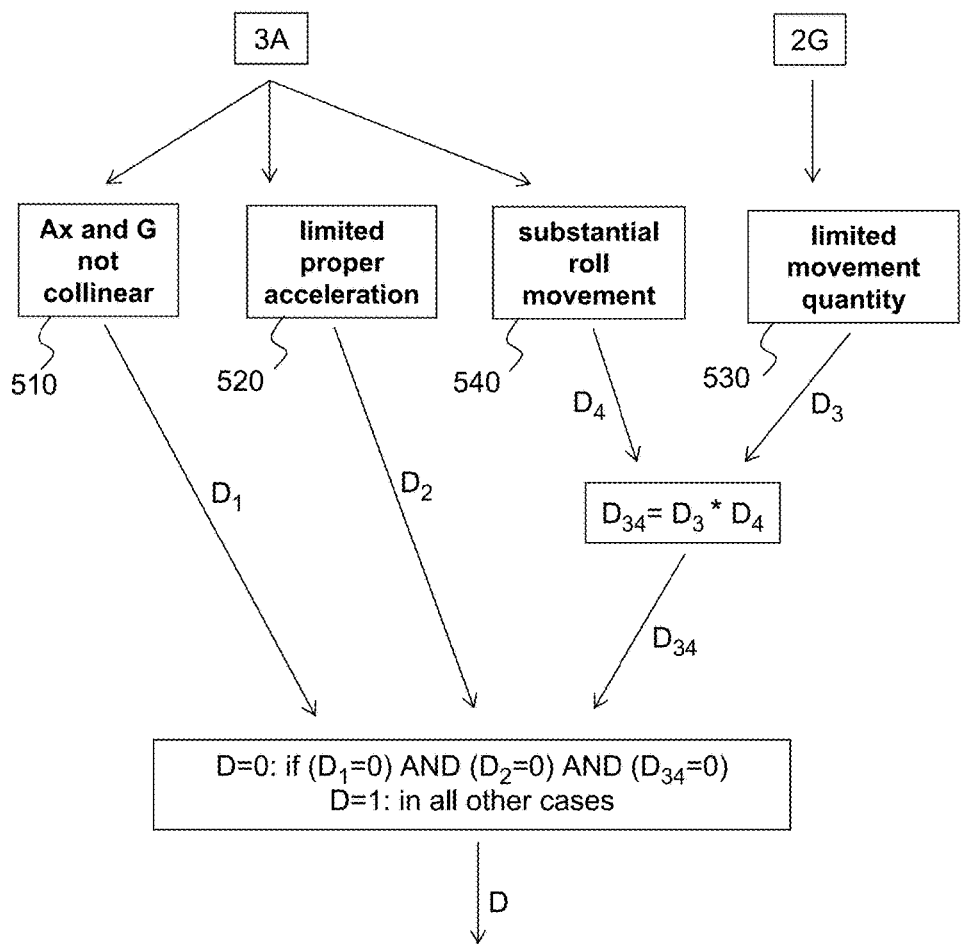
FIG. 5 is a detailed view of part of the flow chart of FIG. 4 when the device of the invention uses a two sensing axis sensor.

FIG. 5 is a detailed view of part of the flow chart of FIG. 4 when the device of the invention uses a two sensing axis sensor (3A2G). In this example, the orientation test is performed.

In this embodiment, two tests are performed systematically and two tests are optional.

A first test (510) is the co-linearity of Ax and G as described above. If the test is positive, the value of $D_1$ will be set at 1.

A second test (520) assesses the proper acceleration of the pointing device by measuring if the value of the norm of the acceleration vector Axyz is lower or higher than a set threshold (Threshold1). If it is higher, we consider the pointing device in a dynamic state and the value of $D_2$ will be set to 1. If not, it will be set to 0. Equivalent tests can be performed on each individual axis.

A third test (530), which is optional, assesses the movement quantity using the gyrometers; the presence of high angular velocities implies also significant acceleration values. The test assesses if the norm Gyz of the measurements of the angular velocity sensor with two sensing axes is lower or higher than a set threshold (Threshold2). If it is higher, the value of $D_3$ will be set to 1. If not, it will be set to 0.

A fourth test (540), which is also optional, can be used for cases where the device is not vertical (the first test is negative, $D_1$=0) and the proper acceleration is limited (the second test is negative, $D_2$=0), but where there is nevertheless a significant rotation movement (the third test is positive, $D_3$=1). In the fourth test (540), the variances V of Ay and Az are compared to respective thresholds (Threshold 3 & 4). If both the variances V are above their respective thresholds, $D_4$ will be set to 0. If not it will be set to 1. This fourth test serves to apply the roll compensation in transitional phases, for example when the user performs a yaw movement with an evolving roll angle. Because of the yaw movement, the third test will be positive ($D_3$=1), but we need to apply the roll compensation anyway due to the changing roll, even though the calculation of the roll might not be 100% correct.

The combination of the optional tests 3 & 4 gives $D_{34}=D_3^*D_4$, meaning that $D_{34}$ is 0 when either $D_3$=0 or $D_4$=0. The dynamicity D, used above in the explanation of FIG. 4*b*, can then be determined using the following logical combination:
(D=0) if ($D_1$=0) AND ($D_2$=0) AND (D34=0)
(D=1) in all other cases.

The logical combination changes depending on the embodiment and which tests are used.

Above, binary results were used in the different dynamicity tests $D_1$ through $D_4$ and in the final logical combination to obtain the dynamicity D. It is also possible that the different tests output a variable (for example between 0 and 1), and that the dynamicity D is a function of these variables, where each test output can also have a different weight in the final calculation.

Figure 6:
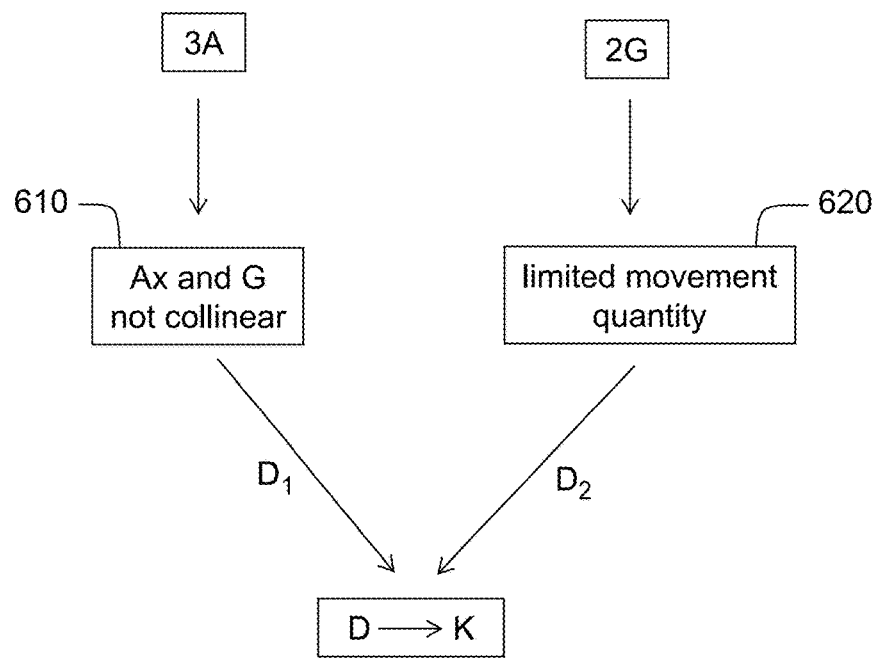
FIG. 6 is a detailed view of part of the flow chart of FIG. 4 when the device of the invention uses a three sensing axis sensor.

FIG. 6 is a detailed view of part of the flow chart of FIG. 4 when the device of the invention uses a three sensing axis sensor (3A3G).

Only the 'colinearity G/Ax' test (610=510) and the 'limited movement quantity' test (620=530) are performed, with the same conditions as explained in relation to the case of the 3A2G embodiment described above in relation to FIG. 5. The 'limited movement quantity' test is used to determine the contribution of the accelerometers in equation 19 and 20.

Figure 7:
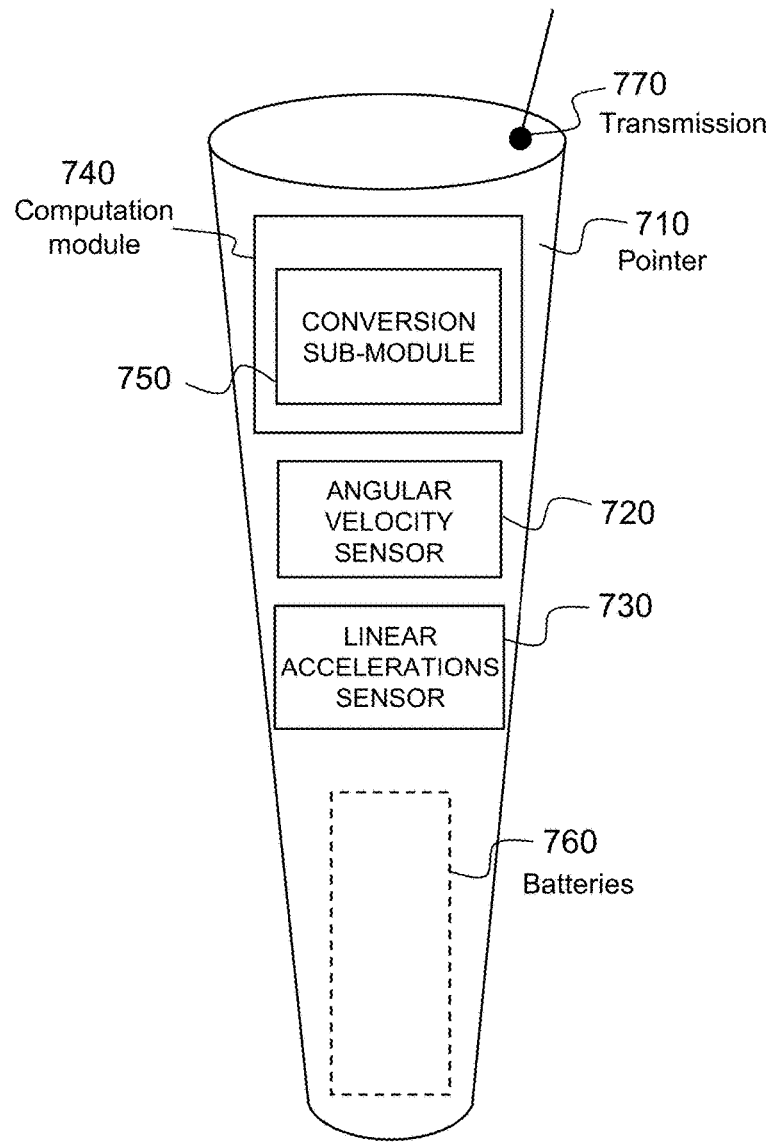
FIG. 7 represents in a simplified manner the hardware architecture of a device according to a number of embodiments of the invention.

FIG. 7 represents in a simplified manner the hardware architecture of a pointer according to an embodiment of the invention.

The object or pointing device 710 or pointer advantageously has the form and the shape of a television remote control, that is to say it is of elongate form, able to be held in the user's hand. It can also be embodied in a smart phone or tablet, as disclosed in the PCT application assigned to the assignee of the instant application, which was published under n°WO2012/065885. In this case, the pointing functions will use the sensors which are embedded in the smart phone or tablet for performing other functions and the "buttons" of the remote will be configurable for various applications to be operated through the touch screen of the smart phone/tablet. Alternatively, it may be fixed to one of the user's limbs, notably in games applications. The pointer is associated with a mobile element able to move in a plane surface, for example a screen or a writing surface. The movements of this mobile element are controlled by the movements of the pointer. The pointer is advantageously provided with buttons on several of its faces to control the functions to which access is made possible by the remote control. The pointer comprises a power supply 760 and a channel of transmission 770 for the object to be controlled. Radiofrequency transmission can be effected with a Bluetooth waveform and protocol or with a Wi-Fi waveform and protocol (Standard 802.11g). Transmission can be performed by infra-red or by radiofrequency. The transmitted signals are the commands corresponding on the one hand to the depression of one of the buttons present on the body of the pointer, which triggers the execution of a function and on the other hand to the sensing of the movement of the pointer so as to control the movements of a cursor on the control screen of the object to be controlled. These control signals are generated by the computation module 740 which comprises a sub-module 750 for converting the torsion imparted to the pointer by the user. This computation module comprises a microprocessor, for example a DSP Texas Instruments TMS320VC5509 for the most demanding applications in terms of computation time, or a 32-bit microcontroller with ARM core, for example one of those from the STR9 family, notably the STR9F12FAW32 from STM. The computation module also preferably comprises a flash memory necessary for storing the code to be executed and the permanent data which it requires and a dynamic work memory. The computation module receives as input the outputs from two types of sensors. On the one hand, angular velocity sensors 720 have the function of measuring the rotations of the pointer in relation to two or three axes. These sensors will preferably be gyrometers. It may be a two-axis gyrometer or a three-axis gyrometer. It is for example possible to use the gyrometers provided by Analog Devices with the reference ADXRS300. But any sensor capable of measuring angular rates or velocities is usable. It is also possible to use magnetometers, in which the displacement with respect to the terrestrial magnetic field makes it possible to measure the rotations with respect to the frame of reference of this field, it is for example possible to use the magnetometers with the reference HMC1001 or HMC1052 from the company Honeywell or KMZ41 from the company NXP. Whichever sensors are used, their measurements are read in the frame of reference of the pointer. The conversion sub-module recovers as input the outputs from a second sensor 730 which measures the linear accelerations of the pointer $A_x$, $A_y$, $A_z$. Preferably, the sensor 730 is a three-axis accelerometer. Advantageously, the sensors 720 and 730 are both produced by MEMS (Micro Electro Mechanical Systems) technology, optionally within one and the same circuit (for example reference accelerometer ADXL103 from Analog Devices, LIS302DL from Thomson, reference gyrometer MLX90609 from Melixis, ADXRS300 from Analog Devices). If appropriate, the MEMS module will be situated near the center of gravity of the pointing device, except if a particular embodiment justifies a different positioning.

The examples disclosed in this specification are only illustrative of some embodiments of the invention. They do not in any manner limit the scope of said invention which is defined by the appended claims.

The invention claimed is:

1. A system for sensing orientation of a moving object in a working reference frame, said system comprising:
    a first sensor for sensing one of angular velocity and angular position of the object with at least two active sensing axes y, z;
    a second sensor for sensing acceleration of the object, the second sensor comprising three sensing axes x, y, z;
    a processing module configured to:
        calculate at a time t a dynamicity variable D representative of a proper acceleration of the object based on measurements from at least one of the first and second sensors, and determine a weighting factor K having a positive correlation with the dynamicity variable D;
        calculate a synthetic vector Vsyn(t) representative of gravity components of the acceleration of the object, said synthetic vector Vsyn(t) being calculated as a weighted average of an acceleration vector Vac with weight (1−K) composed from at least a portion of outputs of the second sensor and a corrected vector Vcor with weight K, composed from at least:
            the output of the second sensor at a last time when the dynamicity variable D was below a threshold, and
    convert object orientation data from a sensing reference frame to the working reference frame by fusing a motion vector Vm composed from at least outputs y, z from the first sensor with the synthetic vector Vsyn(t).

2. The orientation sensing system of claim 1, wherein the dynamicity variable D is derived from results $D_i(i \geq 1)$ of one or more weighted dynamicity tests based on outputs from at least one of the first and the second sensors.

3. The orientation sensing system of claim 2, wherein the dynamicity tests yield binary results ($D_i=\{0;1\}$), and the dynamicity variable D of the system is a logical combination of the results $D_i$ of the dynamicity tests.

4. The orientation sensing system of claim 3, wherein the weighting factor (1−K) is equal to 1 when the dynamicity tests determine that it is in a quasi-static state and equal to null in all other instances.

5. The orientation sensing system of claim 2, wherein at least one of the weighted dynamicity tests is based on a norm N of the outputs of one of the first and second sensor.

6. The orientation sensing system of claim 5, wherein the result $D_i$ of said dynamicity test is null when the norm N falls within a predefined range, and equal to one in all other instances.

7. The orientation sensing system of claim 2, wherein at least one of the weighted dynamicity tests is based on a variance V of the outputs of one of the first and second sensor.

8. The orientation sensing system of claim 7, wherein the variance V is compared to a preset threshold, and the result $D_i$ of said dynamicity test is null when said variance is larger than the threshold, and equal to one in all other instances.

9. The orientation sensing system of claim 2, wherein at least one of the weighted dynamicity tests is an orientation test, where the outputs of at least the second sensor are compared to gravity vector.

10. The orientation sensing system of claim 9, wherein the orientation test is based on an angle between a roll axis of the sensing device and the gravity vector, and the result of the orientation test Di is null when the angle is larger than a preset threshold, and equal to one in all other instances.

11. The orientation sensing system of claim 1, wherein the first sensor comprises two active sensing axes and the corrected vector Vcor at time t equals the acceleration vector Vac at time ts when the object was last in a state where D=0 and wherein the weighting factor (1−K) is a decreasing function of the dynamicity D of the movement of the object.

12. The orientation sensing system of claim 1, wherein the first sensor comprises three active sensing axes and the corrected vector Vcor at time t is computed based on at least one of the outputs of the first sensor at time t.

13. The orientation sensing system of claim 12, wherein weight K is equal to 1 when the dynamicity variable D is equal to 1 and to 0 when D is equal to 0.

14. The orientation sensing system of claim 1, wherein the first sensor is a gyrometer and the second sensor is an accelerometer.

15. A handheld device for controlling a cursor on a display, comprising:
 a first sensor for sensing one of angular velocity and angular position of the handheld device with at least two active sensing axes y, z; and
 a second sensor for sensing acceleration of the handheld device, the second sensor comprising three sensing axes x, y, z;
 said first and second sensors being in communication with a processing module configured to:
 calculate at a time t a dynamicity variable D representative of a proper acceleration of the handheld device based on measurements from at least one of the first and second sensors, and determine a weighting factor K having a positive correlation with the dynamicity variable D;
 calculate a synthetic vector Vsyn(t) representative of the gravity components of the acceleration of the handheld device, said synthetic vector Vsyn(t) being calculated as a weighted average of an acceleration vector Vac with weight (1−K) composed from at least a portion of outputs of the second sensor and a corrected vector Vcor with weight K, composed from at least:
 the output of the second sensor at a last time when the dynamicity variable D was below a threshold, and
 convert handheld device orientation data from a sensing reference frame to a working reference frame by fusing a motion vector Vm composed from at least outputs y, z from the first sensor with the synthetic vector Vsyn(t).

16. The handheld device of claim 15, wherein the first sensor comprises two active sensing axes and the corrected vector Vcor at time t equals the acceleration vector Vac at time ts when the handheld device was last in a state where D=0 and wherein the weighting factor (1−K) is a decreasing function of the dynamicity D of movement of the handheld device.

17. The handheld device of claim 15, wherein the first sensor comprises three active sensing axes and the corrected vector Vcor at time t is computed based on at least one of the outputs of the first sensor at time t.

18. A system for sensing orientation of a moving object in a working reference frame, said system comprising:
 a first sensor for sensing one of angular velocity and angular position of the object with at least three active sensing axes x, y, z;
 a second sensor for sensing acceleration of the object, the second sensor comprising three sensing axes x, y, z;
 a processing module configured to:
 calculate at a time t a dynamicity variable D representative of a proper acceleration of the object based on measurements from at least one of the first and second sensors, and determine a weighting factor K having a positive correlation with the dynamicity variable D;
 calculate a synthetic vector Vsyn(t) representative of gravity components of the acceleration of the object, said synthetic vector Vsyn(t) being calculated as a weighted average of an acceleration vector Vac with weight (1−K) composed from at least a portion of outputs of the second sensor and a corrected vector Vcor with weight K, composed from at least:
 a transform of an output of the first sensor on at least axis x, and
 convert object orientation data from a sensing reference frame to the working reference frame by fusing a motion vector Vm composed from at least outputs y, z from the first sensor with the synthetic vector Vsyn(t).

19. A handheld device for controlling a cursor on a display, comprising:
 a first sensor for sensing one of angular velocity and angular position of the handheld device with at least three active sensing axes x, y, z; and
 a second sensor for sensing acceleration of the handheld device, the second sensor comprising three sensing axes x, y, z;
 said first and second sensors being in communication with a processing module configured to:
 calculate at a time t a dynamicity variable D representative of a proper acceleration of the handheld device based on measurements from at least one of the first and second sensors, and determine a weighting factor K having a positive correlation with the dynamicity variable D;
 calculate a synthetic vector Vsyn(t) representative of gravity components of the acceleration of the handheld device, said synthetic vector Vsyn(t) being calculated as a weighted average of an acceleration vector Vac with weight (1−K) composed from at least a portion of outputs of the second sensor and a corrected vector Vcor with weight K, composed from at least:

a transform of an output of the first sensor on at least axis x, and
convert handheld device orientation data from a sensing reference frame to a working reference frame by fusing a motion vector Vm composed from at least outputs y, z from the first sensor with the synthetic vector Vsyn(t).

\* \* \* \* \*